US007865709B2

(12) United States Patent  
Lee

(10) Patent No.: US 7,865,709 B2
(45) Date of Patent: Jan. 4, 2011

(54) COMPUTER MOTHERBOARD

(75) Inventor: Ming-Lung Lee, Jung-Ho (TW)

(73) Assignees: Micro-Star International Co., Ltd., Jumg-Ho (TW); MSI Electronic (Kun Shan) Co., Ltd., Kunshan (CN)

( * ) Notice: Subject to any disclaimer, the term of this patent is extended or adjusted under 35 U.S.C. 154(b) by 538 days.

(21) Appl. No.: 12/032,937

(22) Filed: Feb. 18, 2008

(65) Prior Publication Data

US 2009/0210687 A1    Aug. 20, 2009

(51) Int. Cl.
*G06F 12/00* (2006.01)
(52) U.S. Cl. .......................... 713/1; 713/400; 713/401; 713/500; 713/501; 713/502; 713/503; 713/600; 713/601; 711/104; 711/167; 711/170
(58) Field of Classification Search ............ 713/1, 713/400–401, 500–503, 600–601; 711/104, 711/167, 170
See application file for complete search history.

(56) References Cited

U.S. PATENT DOCUMENTS 6,122,733 A * 9/2000 Christeson et al. ........... 713/2
6,256,731 B1 * 7/2001 Hall et al. .................... 713/1
6,570,428 B1 * 5/2003 Liao et al. .................. 327/291
7,275,120 B2 * 9/2007 Ou et al. ..................... 710/58
7,543,277 B1 * 6/2009 Righi et al. ................. 717/125
7,707,450 B1 * 4/2010 Elaydi et al. ................ 713/600
2001/0003198 A1 * 6/2001 Wu ............................ 711/104
2007/0016765 A1 * 1/2007 Azzarito et al. .............. 713/2

* cited by examiner

*Primary Examiner*—Abdelmoniem Elamin

(57) ABSTRACT

The present invention discloses a computer motherboard, which comprises: at least one memory module slot, a flash memory, a central processing unit socket; wherein, the memory module slot is used to plug at least one memory module; the flash memory is used to store BIOS programming codes, in which the BIOS programming codes are provided with at least one memory configuration programming codes for configuring the memory frequency and memory timing of the memory module; the central processing unit socket is used to plug the CPU, and the CPU is at least used to execute the memory configuration programming codes, so, after execution, they could provide a plurality of parameter options for memory frequency and memory timing of the memory modules to be selected one from them.

9 Claims, 6 Drawing Sheets

```
            Advanced Chipest Features
HT Frequency              [Auto]                    Help Item
HT Width                  [↓16 ↑16]
Err94 Enh                 [Disabled]              Menu Level ▷
SSE/SSE2 Instructions     [Enabled]
Memory Hole for PCI MM10  [Disabled]
Max Memclock (Mhz)        [Auto]
Current Memclock (Mhz)    200
DDR Timing Setting by     [Manual]
CAS# latency              [CL=2.5]
Row cycle time       (tRC) [11 bUS Clocks]
Row refresh cyc time (tRFC)[15 bUS Clocks]
RAS# to CAS# delay   (tRCD)[ 3 bUS Clocks]
Row to Row  delay    (tRCD)[ 2 bUS Clocks]
Min RAS# active time (tRAS)[ 8 bUS Clocks]
Row precharge Time   (tRP) [ 3 bUS Clocks]
write recovery time  (tWR) [ 3 bUS Clocks]
write to Read delay  (tWTR)[ 2 bUS Clocks]
Read to Read delay   (tRWT)[ 4 bUS Clocks]
Refresh period       (tREF)[2x3120 Cycles]
```

FIG. 1B

(PRIOR ART)

40

| CMOS Setup Utility-Copyright (C) 1985-2004, xxx,Inc. | | |
|---|---|---|
| Frequency/Voltage Control | | |

| | | Help Item |
|---|---|---|
| Current CPU Frequency | 333MHz | Set the DRAM Timing by the Choosed Memory Frequency |
| Current DRAM Frequency | 533MHz | |
| D.O.T. Control | [Disabled] | Options |
| Adjust CPU FSB Frequency | [200] | |
| Adjust CPU Frequency | [3333] | Auto |
| Adjust DRAM Frequency | [Auto] | 400 |
| Adjusted DDR Memory Frequency | [533] | 533 |
| Configure DRAM Time by SPD | [Disable] | 667 —— 203 |
| DRAM Timing Adjust | [Auto] | 800 |
| Adjust AGP/PCI Frequency | [33.3] | 1066 |
| Adjust PCIE Frequency | [100] | 1333 |
| Auto Disable DIMM/PCI Freque | [Enabled] | 1600 |
| CPU Volatge | [ 0%] | 2000 |
| Memory Volatge | [1.90] | |
| NB Volatge | [1.55] | |
| FSB Volatge | [ 0%] | |

FIG. 4B

COMPUTER MOTHERBOARD

FIELD OF THE INVENTION

The present invention relates to a computer motherboard, and particularly to a computer motherboard having BIOS programming codes, which is to separate the configuration tasks for memory frequency and memory timing of the main memory, and also let the users easily modifying the configuration of memory frequency and memory timing of the main memory.

BACKGROUND OF THE INVENTION

In FIG. 1A, most of the conventional BIOS (Basic Input Output System) programming codes can only configure the memory frequency of the main memory, and, referring to the "Adjust DRAM Frequency" control in FIG. 1A, and could not provide the configuration for memory timing of the main memory. The conventional BIOS programming codes in FIG. 1A could not satisfy the requirement of memory parameter configuration for current memory module, such as DDR3 memory module.

In FIG. 1B, another improved conventional BIOS programming codes could provide the configuration function for both memory frequency and memory timing of the main memory. However, for the configuration of memory timing, referring to "DDR Timing Setting By" control in FIG. 1B, it will ask the user to input the too professional parameters, and cause the users daring not to input because he/she could not understand.

In view of the improvement requirement on the BIOS programming codes for a computer motherboard regarding to the configuration of memory frequency and memory timing for the main memory, the inventor has invented and improved a computer motherboard having BIOS programming codes, which could let the user easily modifying the configuration of memory frequency and memory timing for the main memory.

SUMMARY OF THE INVENTION

The first object of the present invention is to provide a computer motherboard having BIOS programming codes, which could let the users easily modifying the configuration of memory frequency and memory timing for the main memory.

The second object of the present invention is to provide a computer motherboard having BIOS programming codes which could separate the configuration tasks of both memory frequency and memory timing for the main memory, and let the user easily modifying the configuration of memory frequency and memory timing for the main memory.

To this end, the present invention provides a computer motherboard, which comprises: at least one memory module slot, which is used to plug at least one memory module; a flash memory, which is used to store the BIOS programming codes, in which the BIOS programming codes have at least one memory configuration programming codes for configuring the memory frequency and memory timing for the memory module; a central processing unit socket for plugging the central processing unit (CPU), and the CPU is at least used to execute the memory configuration programming codes, so, after execution, it could provide a plurality of parameter options for the memory frequency and memory timing of the memory module to be selected one from them.

BRIEF DESCRIPTION OF THE DRAWINGS

These and other modifications and advantages will become even more apparent form the following detained description of a preferred embodiment of the invention and from the drawings in which:

FIG. 1B is a screen diagram for the conventional BIOS programming codes executing the memory timing configuration for the main memory;

FIG. 4B is a screen diagram for executing the memory configuration programming codes to configure the memory timing according to the present invention.

DETAILED DESCRIPTION OF THE INVENTION

Figure 1A:
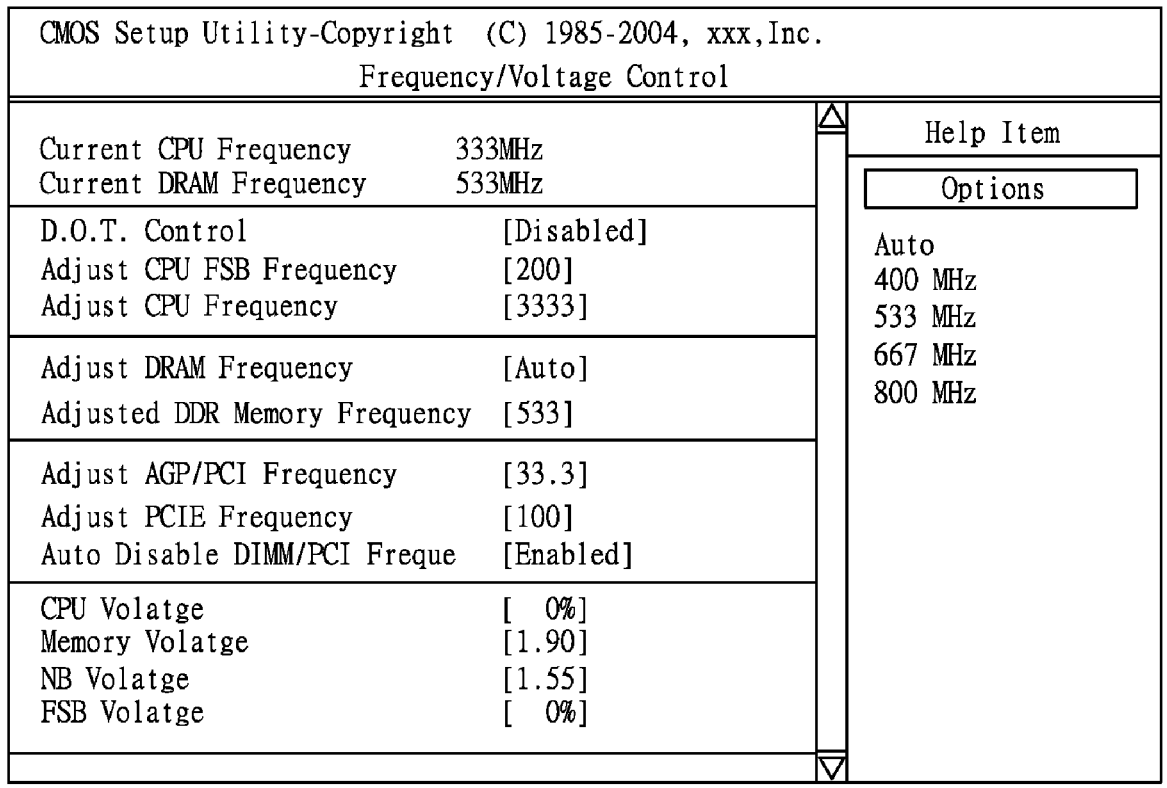
FIG. 1A is a screen diagram for the conventional BIOS programming codes executing the memory frequency configuration for the main memory.
Figure 2:
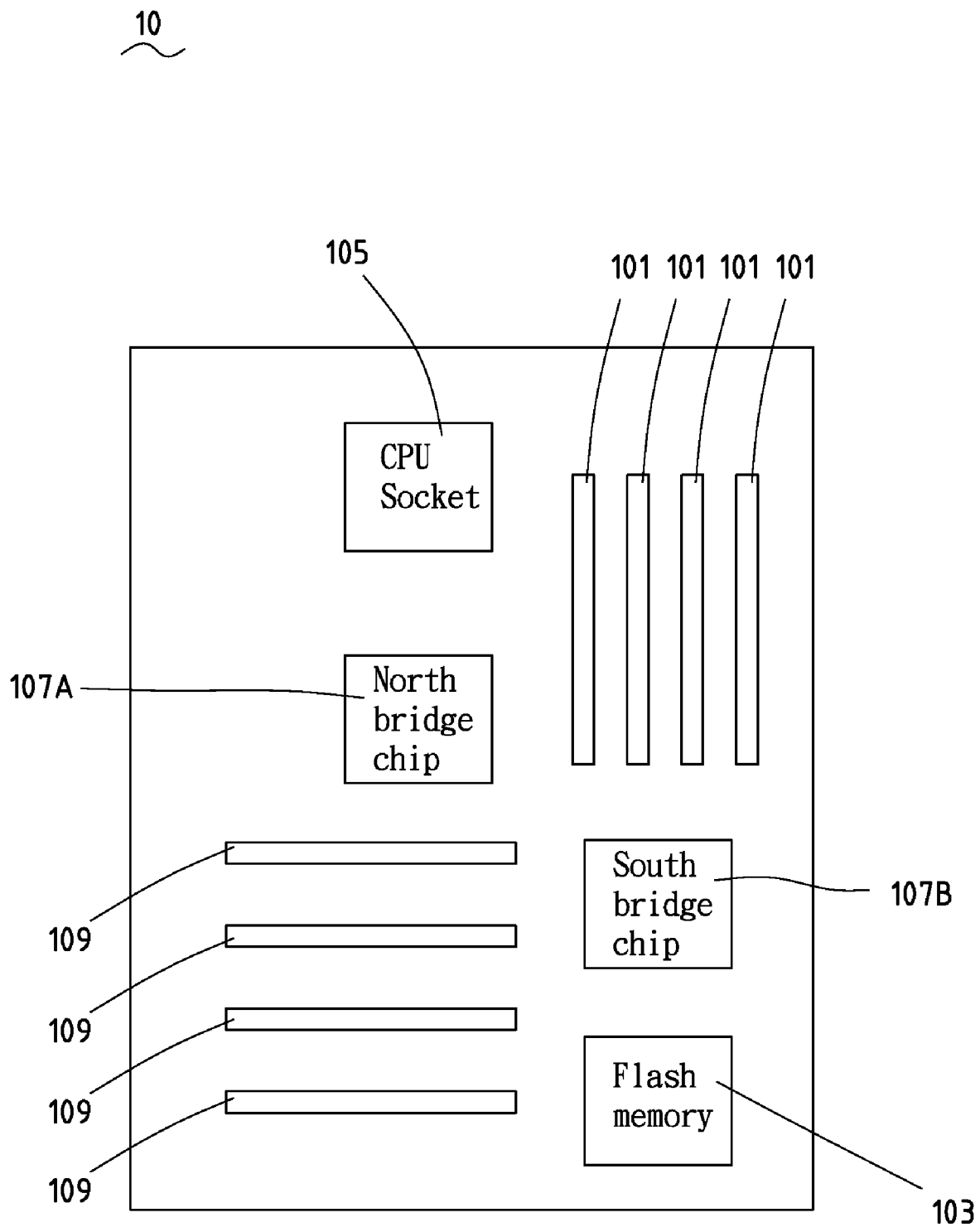
FIG. 2 is a structural diagram for a computer motherboard according to the present invention.
Figure 3:
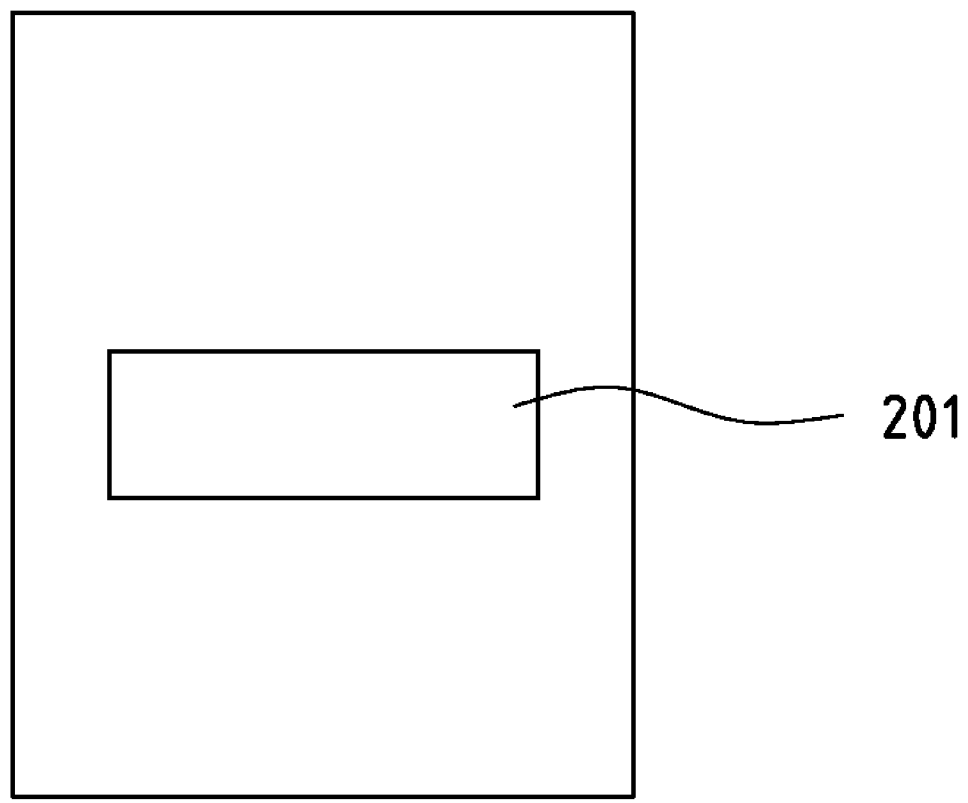
FIG. 3 is a structural diagram for the BIOS programming codes according to the present invention.

FIG. 2 is a structural diagram of a computer motherboard according to the present invention, and FIG. 3 is a structural diagram of BIOS programming codes according to the present invention. The main technical feature for the computer motherboard 10 according to the present invention is to provide the user for configuration on two parameters of memory frequency and memory timing for the main memory. The configuration means is that, when the computer is booting and executing the BIOS (Basic Input Output System) programming codes, the user could employ the options to self-select the parameter options of memory frequency and memory timing. Except for BIOS programming codes 20, the other components on the computer motherboard 10 according to the present invention could directly employ the means in the prior art.

The hardware components on the computer motherboard 10 according to the present invention at least comprise: at least one memory module slot 101, a flash memory 103, a CPU socket 105, a northbridge chip 107A, and a southbridge chip 107B. The memory module slots 101 are used to plug the memory modules (not shown), and the memory modules are used as the main memory. The flash memory 103 is stored with BIOS programming codes 20.

The memory module slot 101, for example, could employ the dual in-line memory module slot. The interface card slot 109, for example, could employ the PCI Express slot and PCI slot.

Except of memory configuration programming codes 201, other programming codes of BIOS programming codes 20 could directly employ the means in the prior art. Please refer to FIG. 4A and 4B. The memory configuration programming codes 201 employ the selection method with a plurality of parameter options (for example, selecting with the up and down arrow keys on the keyboard), to provide the user for the configuration on two parameters of memory frequency and memory timing for the main memory. The plurality of parameter options include a plurality of memory frequency parameter options 202 and a plurality of memory timing parameter options 203.

Figure 4A:
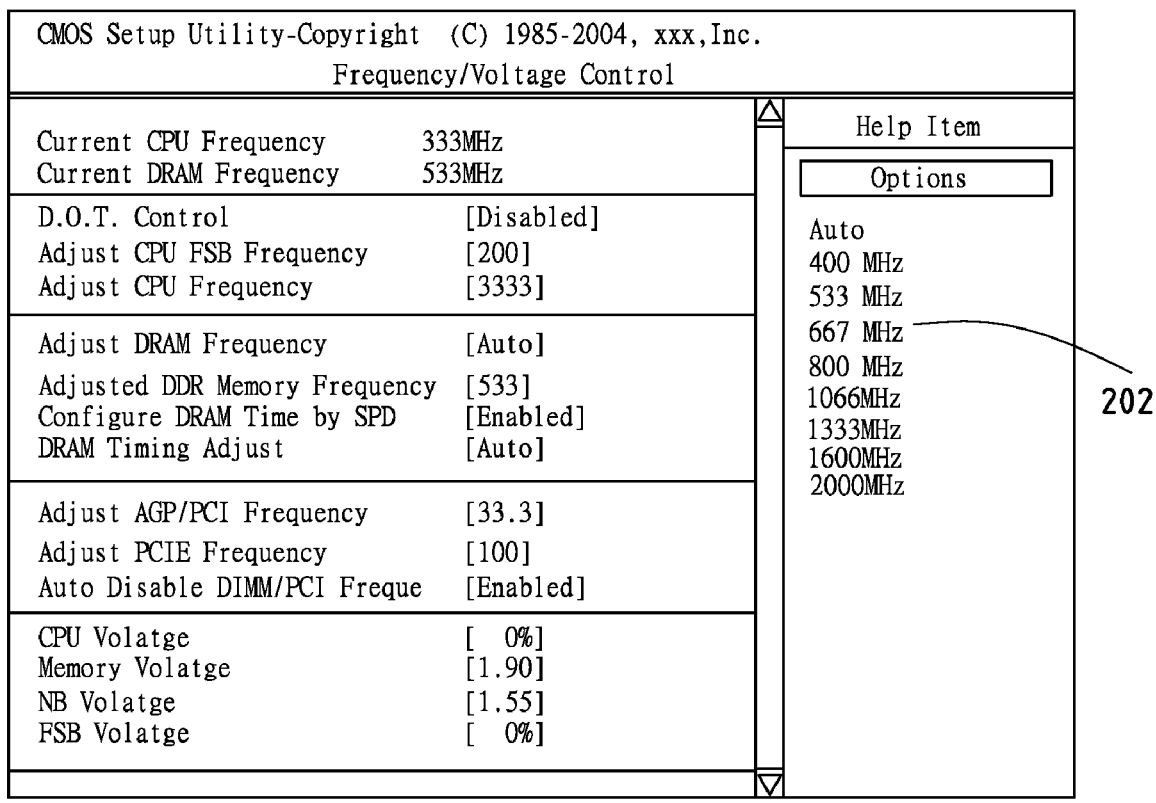
FIG. 4A is a screen diagram for executing the memory configuration programming codes to configure the memory frequency according to the present invention.

In FIG. 4A, the "Adjust DRAM Frequency" control employs the pressing of up and down arrow keys on the keyboard to select one memory frequency parameter option 202 from a plurality of memory frequency parameter options 202 for Auto, 400 MHz, 533 MHz, 667 MHz, 800 MHz, 1066 MHz, 1333 MHz, 1600 MHz and 2000 MHz as shown on the screen 30 as the memory frequency for the main memory.

In FIG. 4B, the "Configure DRAM Timing By SPD" control is first selected as "Disable"; then, employing the pressing of up and down arrow keys on the keyboard to select one memory timing parameter option 203 from a plurality of memory timing parameter options 203 for Auto, 400, 533, 667, 800, 1066, 1333, 1600, 2000 as the memory timing for the main memory. The present invention is to select one of memory frequency values to configure the desired memory timing.

When the user has selected the new memory frequency and memory timing, the memory configuration programming codes will immediately calculate a set of new memory parameters, such as tCL, tRCD, tRP, and tRAS and the like, and then configure the set of new memory parameters into the memory controller.

Herein, there will be provided with three examples to explain how the memory configuration programming codes 201 calculate the new tRAS memory parameters based on the newly selected memory frequency and memory timing. The skilled in the art could easily appreciate from the disclosed calculation means for the new tRAS memory parameter to calculate and obtain other memory parameters.

In the first example, the memory module slot 101 is plugged with DDR2 memory module. The newly selected memory frequency and memory timing by the user are 800 MHz and 800, respectively. Because 800 MHz is a speed of double data rate (DDR), the real frequency should be 400 MHz, and the corresponding clock is 2.5 ns. Then, based on the bytes read out from the 30th byte in the Serial Presence Detect (SPD) chip on DDR2 memory module being 0F, it means that the default value for tRAS recorded in SPD chip is 15 ns. Thus, the calculation for the new tRAS memory parameter is as follows:

$$tRAS=15\ ns/2.5\ ns=6T$$

Next, the memory configuration programming codes 201 will configure the new tRAS memory parameter 6T into the memory controller.

In the second example, the memory module slot 101 is plugged with DDR2 memory module. The newly selected memory frequency and memory timing by the user are 800 MHz and 667, respectively. Because 667 MHz is a speed of double data rate (DDR), the real frequency should be 333 MHz, and the corresponding clock is 3 ns. Then based on the bytes read out from the 30th byte in the SPD chip on DDR2 memory module being 0F, it means that the default value for tRAS recorded in SPD chip is 15 ns. Thus, the calculation for the new tRAS memory parameter is as follows:

$$tRAS=15\ ns/3\ ns=5T$$

Next, the memory configuration programming codes 201 will configure the new tRAS memory parameter 5T into the memory controller.

In the third example, the memory module slot 101 is plugged with DDR2 memory module. The newly selected memory frequency and memory timing by the user are 800 MHz and 1066, respectively. Because 1066 MHz is a speed of double data rate (DDR), the real frequency should be 533 MHz, and the corresponding clock is 1.875 ns. Then, based on the bytes read out from the 30th byte in the SPD chip on DDR2 memory module being 0F, it means that the default value for tRAS recorded in SPD chip is 15 ns. Thus, the calculation for the new tRAS memory parameter is as follows:

$$tRAS=15\ ns/1.875\ ns=8T$$

Next, the memory configuration programming codes 201 will configure the new tRAS memory parameter 8T into the memory controller.

Furthermore, the above-mentioned parameter options could employ the method of linear incrementing or linear decrementing to provide the user to select one value. For example, the memory frequency parameter option 202 could be linearly incremented on 400 MHz, 401 MHz, . . . 2000 MHz to increase the memory frequency or be linearly decremented on 2000 MHz, 1999 MHz, . . . , 400 MHz to reduce the memory frequency, and the user could press the up and down arrow keys on the keyboard to increase or decrease. For example, the memory timing parameter option 203 could be linearly incremented on 400, 401, . . . , 2000 to increase the memory timing, or be linearly decremented on 2000, 1999, . . . , 400 to reduce the memory timing, and the user could press the up and down arrow keys on the keyboard to increase or decrease.

The computer motherboard according to the present invention employs the modification of BIOS programming codes 20 to separate the configuration tasks of both memory frequency and memory timing for the main memory. For example, the user could adjust the computer motherboard as fast memory frequency and fast memory timing by himself/herself, so as to obtain the operation in performance mode. Moreover, for example, the user could adjust the computer motherboard as slow memory frequency and slow memory timing by himself/herself, so as to obtain the operation in stability mode. Thus, the user could obtain more flexible combination of operation modes for the computer motherboard, which are the advantages and benefits of the present invention.

The present invention has been disclosed with preferred embodiments as above. However, the disclosed embodiments are not used to limit the present invention. The skilled in the art could make slight changes and modification without departing from the spirit and scope of the present invention, and the changes and modification made thereto are all covered by the scope of the present invention.

What is claimed is:

1. A computer motherboard, which comprises:
   at least one memory module slot, which is used to plug at least one memory module;
   a flash memory, which is used to store BIOS programming codes, in which the BIOS programming codes are provided with at least one memory configuration programming code to configure the memory frequency and memory timing for the memory module;
   a CPU socket, which is used to plug a CPU, in which the CPU is at least used to execute the memory configuration programming codes, so, after execution, it could provide a plurality of parameter options on memory frequency and memory timing for the memory module to be selected one from them.

2. The computer motherboard according to claim 1, wherein the memory module comprises at least one memory chip, in which the memory chip is selected from a DDR memory chip, a DDR2 memory chip, and a DDR3 memory chip.

3. The computer motherboard according to claim 1, wherein the parameter options for the memory frequency at least includes: Auto, 400 MHz, 533 MHz, 667 MHz, 800 MHz, 1066 MHz, 1333 MHz, 1600 MHz, and 2000 MHz.

4. The computer motherboard according to claim 1, wherein the parameter options for the memory timing at least includes: Auto, 400, 533, 667, 800, 1066, 1333, 1600, and 2000.

5. The computer motherboard according to claim 1, wherein the parameter options for the memory frequency are a plurality of linearly incremented memory frequencies.

6. The computer motherboard according to claim 1, wherein the parameter options for the memory frequency are a plurality of linearly decremented memory frequencies.

7. The computer motherboard according to claim 1, wherein the parameter options for the memory timing are a plurality of linearly incremented memory timings.

8. The computer motherboard according to claim 1, wherein the parameter options for the memory timing are a plurality of linearly decremented memory timings.

9. The computer motherboard according to claim 1, wherein the CPU executes the memory configuration programming codes further based on the contents recorded in a Serial Presence Detect (SPD) chip and these selected parameter options, so, after execution, it could at least calculate a tCL, a tRCD, a tRP, and a tRAS.

* * * * *